US012151388B2

(12) United States Patent
Strauss

(10) Patent No.: US 12,151,388 B2
(45) Date of Patent: Nov. 26, 2024

(54) MULTI LOCK MEMBER KNIFE BLADE RELEASE

(71) Applicant: Stanley Black & Decker, Inc., New Britain, CT (US)

(72) Inventor: Ralf Strauss, Stanley, NC (US)

(73) Assignee: Stanley Black & Decker, Inc., New Britain, CT (US)

( * ) Notice: Subject to any disclaimer, the term of this patent is extended or adjusted under 35 U.S.C. 154(b) by 317 days.

(21) Appl. No.: 17/504,830

(22) Filed: Oct. 19, 2021

(65) Prior Publication Data

US 2022/0032484 A1 Feb. 3, 2022

Related U.S. Application Data

(63) Continuation of application No. PCT/US2020/029534, filed on Apr. 23, 2020.

(60) Provisional application No. 62/837,445, filed on Apr. 23, 2019.

(51) Int. Cl.
*B26B 5/00* (2006.01)

(52) U.S. Cl.
CPC .................................... *B26B 5/003* (2013.01)

(58) Field of Classification Search
None
See application file for complete search history.

(56) References Cited

U.S. PATENT DOCUMENTS

| | | | | |
|---|---|---|---|---|
| 3,577,637 | A * | 5/1971 | Braginetz | B26B 5/001 30/162 |
| 3,845,554 | A | 11/1974 | Lavoie et al. | |
| 4,586,256 | A * | 5/1986 | Weimann | B26B 5/001 30/162 |
| 6,000,136 | A | 12/1999 | Owens | |

(Continued)

FOREIGN PATENT DOCUMENTS

| | | | |
|---|---|---|---|
| DE | 20305513 | U1 | 9/2003 |
| EP | 2113346 | A1 | 11/2009 |

(Continued)

OTHER PUBLICATIONS

International Search Report, dated Aug. 7, 2020, for corresponding PCT application No. PCT/US2020/029534.

(Continued)

*Primary Examiner* — Hwei-Siu C Payer
(74) *Attorney, Agent, or Firm* — Gabriel A. Haboubi

(57) ABSTRACT

A utility knife includes a housing and a slidable blade assembly configured to selectively receive a removable blade in a blade channel thereof and to slide relative to the housing, such that the removable blade is stored within the housing when the slidable blade assembly is in a retracted position, and a portion of the blade extends outwardly from the housing when the slidable blade assembly is in an extended position. The slidable blade assembly comprises a plurality of notch engaging protrusions configured to move to selectively enter the blade channel to engage one or more notches of the removable blade. The housing comprises a blade release actuator configured to move or permit movement of the plurality of notch engaging protrusions out of the blade channel to permit removal of the removable blade from the slidable blade assembly.

10 Claims, 8 Drawing Sheets

(56) References Cited

U.S. PATENT DOCUMENTS

| | | | |
|---|---|---|---|
| 6,192,589 B1 | 2/2001 | Martone et al. | |
| 6,249,975 B1 | 6/2001 | Lin | |
| 6,735,872 B1 | 5/2004 | Chang | |
| 6,829,827 B2 | 12/2004 | Tseng | |
| 6,971,178 B2 * | 12/2005 | Rowlay | B26B 5/001 30/162 |
| 7,296,354 B2 * | 11/2007 | Van Deursen | B26B 1/04 30/162 |
| 8,413,337 B2 | 4/2013 | Price | |
| 8,701,293 B2 | 4/2014 | Sullivan | |
| 9,009,979 B2 | 4/2015 | De Buyer-Mimeure | |
| 2005/0283983 A1 * | 12/2005 | Huang | B26B 5/001 30/162 |
| 2007/0011882 A1 * | 1/2007 | Ping | B26B 1/042 30/162 |
| 2008/0189956 A1 | 8/2008 | Polei | |
| 2009/0165309 A1 | 7/2009 | Kamb et al. | |
| 2009/0223063 A1 | 9/2009 | Hallquist et al. | |
| 2010/0107424 A1 | 5/2010 | Garcia et al. | |
| 2010/0126024 A1 | 5/2010 | Price | |
| 2011/0088264 A1 | 4/2011 | Muccino et al. | |
| 2011/0283542 A1 | 11/2011 | Wu | |
| 2014/0173908 A1 | 6/2014 | Spaulding | |
| 2022/0032484 A1 * | 2/2022 | Strauss | B26B 5/001 |

FOREIGN PATENT DOCUMENTS

| | | |
|---|---|---|
| EP | 2898999 B1 | 8/2018 |
| GB | 2396129 B | 7/2005 |
| GB | 2418386 B | 2/2009 |
| GB | 2462539 B | 12/2011 |

OTHER PUBLICATIONS

Extended European Search Report, dated Jan. 2, 2023, in corresponding EP application No. 20794195.6-1105/3959051 PCT/US2020/029534.

PCT International Preliminary Report on Patentability and Written Opinion of the International Searching Authority, dated Aug. 7, 2020, in corresponding PCT application No. PCT/US202/029534.

* cited by examiner

MULTI LOCK MEMBER KNIFE BLADE RELEASE

CROSS-REFERENCE TO RELATED APPLICATION

The present application is a continuation of international application PCT/US2020/029534 filed on Apr. 23, 2020 which claims priority under 35 U.S.C. § 119 to U.S. Provisional Application Ser. No. 62/837,445, filed on Apr. 23, 2019, and wholly incorporated by reference.

FIELD OF THE INVENTION

The present invention relates generally to hand tools.

BACKGROUND OF THE INVENTION

Utility knives are often configured to house a replaceable blade, which are held by a sliding blade holder assembly in the housing, so the blade can selectively retract into or extend out of the handle of the utility knife. Conventionally, utility knife blades are trapezoidal, and are configured so that one side of the blade may be used, while the other side of the blade is held within the housing, fixing the blade relative to the housing. When it is desirable to replace the blade, the blade may be rotated in the blade holder assembly, so that the side of the trapezoid previously used (and presumably dulled through use) is held within the housing, while the side of the trapezoid previously retained within the housing may be selectively exposed for use. When desired (e.g., once both sides of the trapezoidal blade are thoroughly used) the previous blade may be discarded, and a new blade may be inserted into the housing.

Among other things, the present application relates to an improved locking mechanism to hold the utility knife blade to the sliding blade holder assembly.

SUMMARY OF THE INVENTION

According to one aspect of this disclosure, a utility knife includes a housing and a slidable blade assembly configured to selectively receive a removable blade in a blade channel thereof and to slide relative to the housing, such that the removable blade is stored within the housing when the slidable blade assembly is in a retracted position, and a portion of the blade extends outwardly from the housing when the slidable blade assembly is in an extended position. The slidable blade assembly comprises a plurality of notch engaging protrusions configured to move to selectively enter the blade channel to engage one or more notches of the removable blade. The housing comprises a blade release actuator configured to move or permit movement of the plurality of notch engaging protrusions out of the blade channel to permit removal of the removable blade from the slidable blade assembly.

These and other objects, features, and characteristics of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. In one embodiment of the invention, the structural components illustrated herein are drawn to scale. It is to be expressly understood, however, that the drawings are for the purpose of illustration and description only, and are not intended as a definition of the limits of the invention. In addition, it should be appreciated that structural features shown or described in any one embodiment herein can be used in other embodiments as well. As used in the specification and in the claims, the singular form of "a", "an", and "the" include plural referents unless the context clearly dictates otherwise.

BRIEF DESCRIPTION OF THE DRAWINGS

Features of utility knives in accordance with one or more embodiments are shown in the drawings, in which like reference numerals designate like elements. The drawings form part of this original disclosure in which.

DETAILED DESCRIPTION OF THE ILLUSTRATED EMBODIMENT(S)

Figure 1:
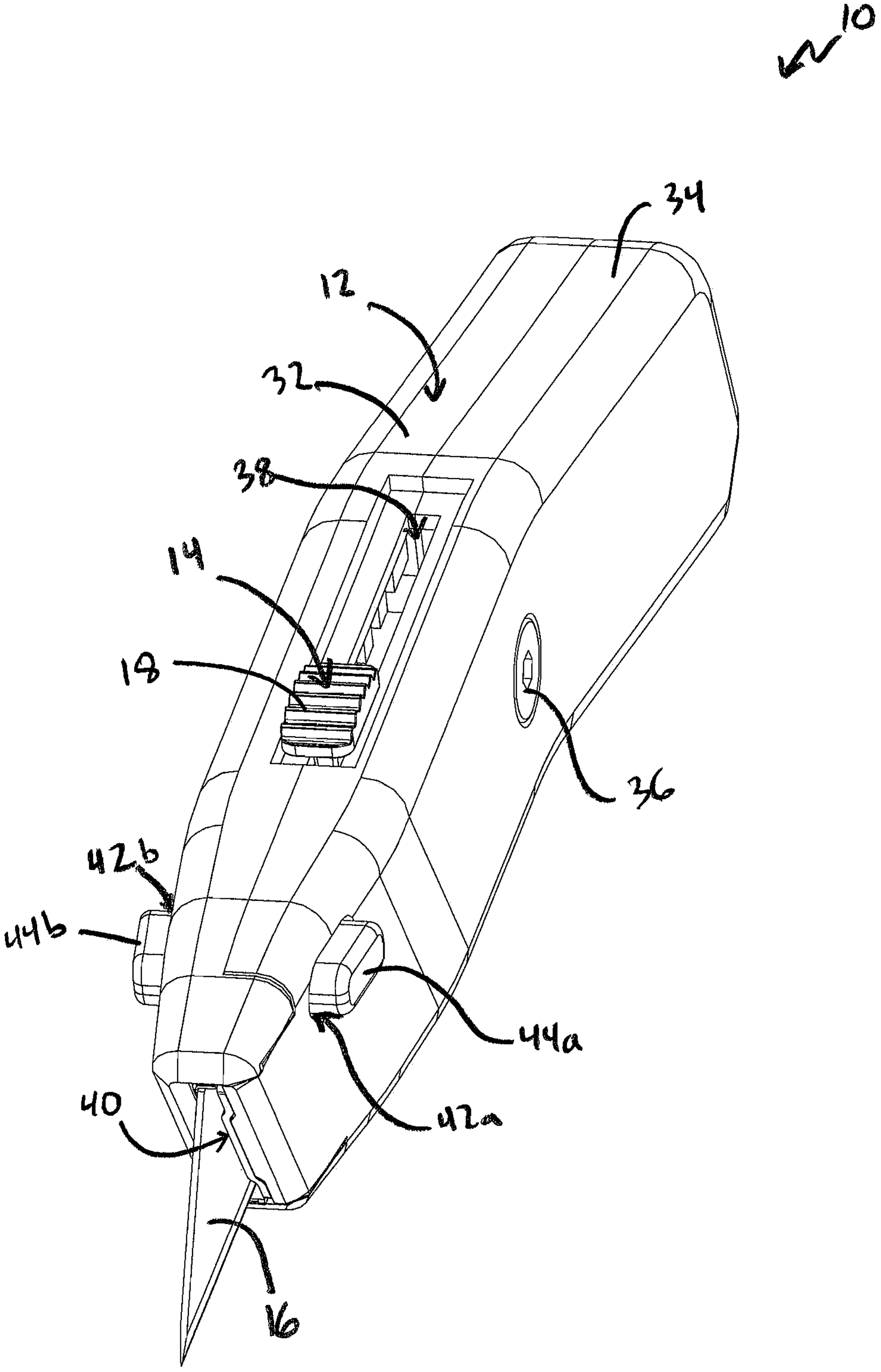
FIG. 1 illustrates a perspective view of a utility knife according to an aspect of the present disclosure.

FIG. 1 shows an embodiment of a utility knife, generally designated at 10, constructed according to the principles of the present invention. The utility knife 10 includes a main body 12 and a blade holder assembly 14 movably mounted within the main body 12. Various aspects of the blade holder assembly 14 may be of conventional construction and is constructed and arranged to mount a conventional utility knife blade 16.

The blade holder assembly 14 is movable between a retracted position (not shown) wherein the blade 16 is disposed within the main body 12 and an extended position (shown in FIG. 1) wherein the blade 16 protrudes outwardly from the main body 12 to enable a cutting operation. The extended position may include not only a fully extended position, but may also include at least one intermediate position wherein the blade can be releasably locked at a position in which only a part of the possible extent of the blade extends from the main body. A manually engageable member 18 of the blade holder assembly 14 is slidably mounted in the main body 12 and is operatively connected with the remainder of the blade holder assembly 14 such that movement of the manually engageable member 18 moves the blade holder assembly 14 between the extended and retracted positions.

In the illustrated embodiment, the main body portion 12 is comprised of a body structure having two mating body halves 32, 34, The body halves 32, 34 are secured together to form the main body portion 12 by a threaded or other type of conventional fastener 36. It may be appreciated in various embodiments that the fastener 36 may comprise adhesives, welds, engagement features, or molding or bonding techniques. The main body 12 is shaped to engage the palm of a gripping hand to provide the palm with a comfortable gripping surface, and is preferably made of an appropriate metal (preferably aluminum or steel), rigid plastic, polymer, fiber-reinforced polymer, carbon fiber, or other material or combinations of materials of suitable strength.

The body halves 32, 34 cooperate to form an upper slot 38 for the manually engageable member 18 and a front slot 40 sized to allow the blade 16 mounted in the blade holder assembly 14 to move in and out of the main body 12. The interior of the main body 12 is configured to slidably receive the blade holder assembly 14 therein for longitudinal movement with respect thereto. As further shown, in an embodiment each of the body halves 32, 34, comprise an associated blade release actuator aperture (42*a* and 42*b* respectively), through which blade release actuators (44*a* and 44*b* respectively) protrude.

Figure 2:
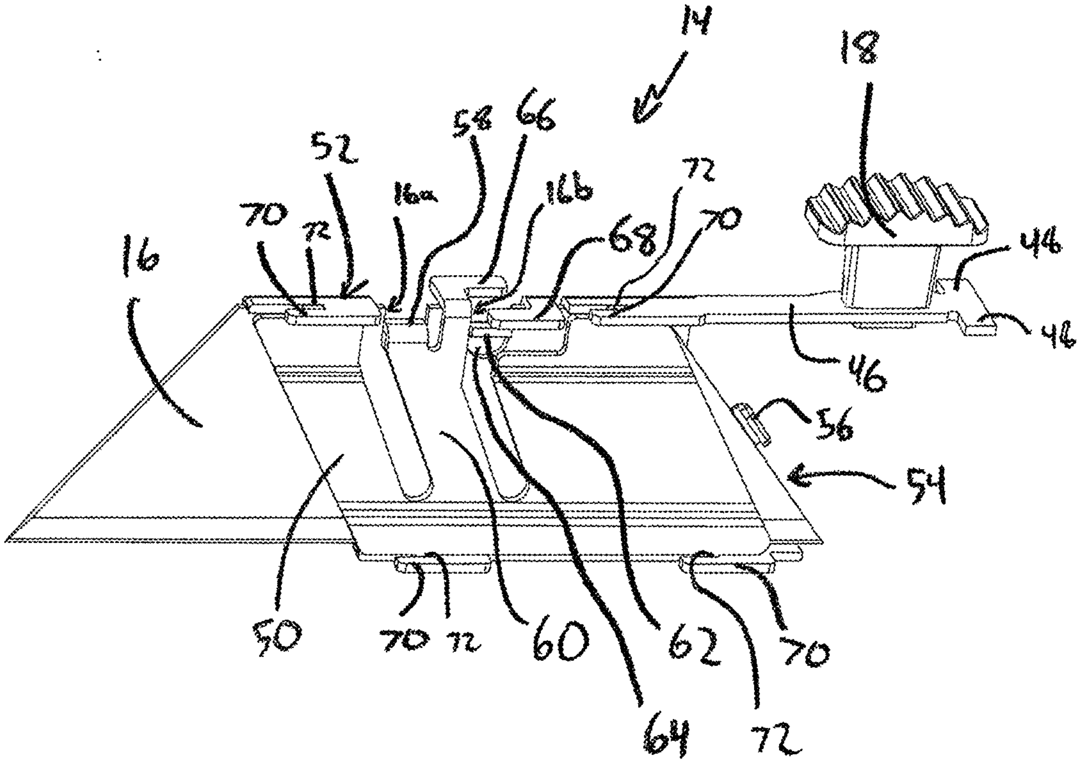
FIG. 2 illustrates an isolated perspective view of the blade holder assembly of the utility knife of FIG. 1 holding a blade therein.
Figure 3:
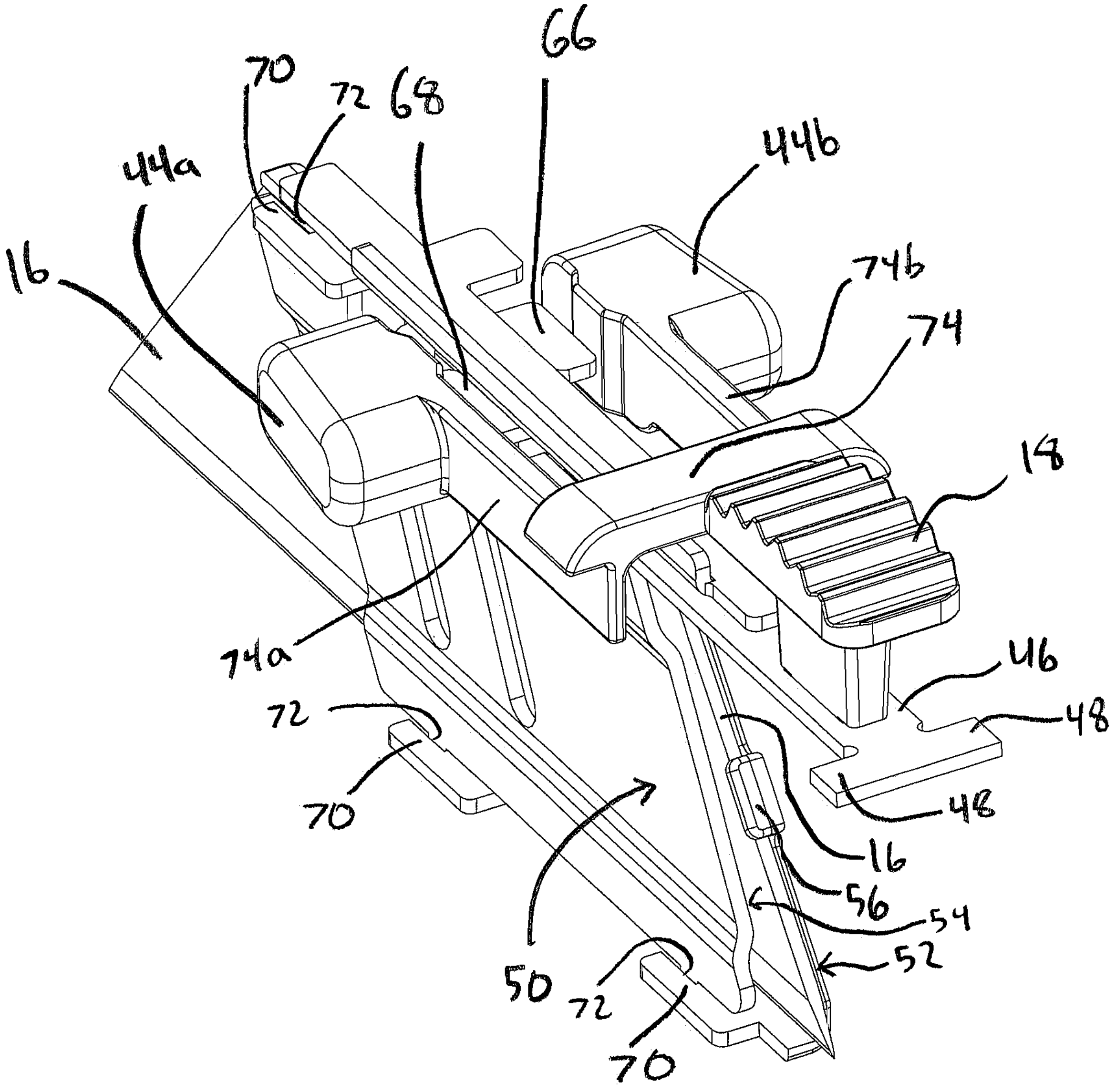
FIG. 3 illustrates an isolated perspective view of the blade holder assembly of FIG. 2, alongside blade release actuators.

The blade holder assembly 14 is shown in isolation in FIG. 2, while FIG. 3 illustrates the blade holder assembly 14 together with the blade release actuators 44*a*,44*b*. As shown in FIG. 2, the blade holder assembly 14 may include the manually engageable member 18 mounted on a blade position arm 46 that includes engagement features 48 that may selectively engage blade position slots formed in the main body 12 that hold the blade holder assembly 14 at one or more pre-defined positions of extension or retraction relative to the main body 12. Accordingly, it may be appreciated that the blade position arm 46 may be formed of a resilient material (e.g., spring steel) or may otherwise be configured such that when the manually engageable member 18 is depressed into the upper slot 38, the engagement features 48 may disengage from the blade position slots in the main body so that the blade holder assembly 14 may slide along the upper slot 38, and may snap into another blade position slot associated with another position of the blade holder assembly relative to the main body 12.

As further shown in FIG. 2, the blade holder assembly 14 may include a first side member 50 and a second side member 52, one or both of which may couple to the blade position arm 46. It may be appreciated that the first side member 50 and second side member 52 may together be shaped to sandwich the blade 16 therebetween in a blade channel 54. As shown, in the illustrated embodiment the second side member 52 includes a channel terminating protrusion 56 that extends towards a plane of the first side member so as to enclose the blade channel 54 at a rear end of the blade channel 54 distal from the front slot 40 of the main body 12.

It may be appreciated that conventional utility knife blades include notches or apertures therein to facilitate securing such blades into associated knife housings. Some blades, such as the blade 16 illustrated, include a first notch 16*a* and a second notch 16*b* therein. Some conventional blade holder assemblies are shaped to engage one of the first notch 16*a* and the second notch 16*b*, such that the blade may be rotated relative to the blade holder assembly to engage the other of the first notch 16*a* and the second notch 16*b*, presenting the opposing end of the blade 16 for use in a cutting operation. As further shown In FIG. 2, the first side 50 includes a first notch engaging protrusion 58 mounted fixed on a first lock arm 60. Although partially obscured, it may be appreciated that the second side 52 includes a second notch engaging protrusion 62 mounted fixed on a second lock arm 64. As shown, fixed relative to the first notch engaging protrusion 58 is a first lock actuator 66, which fixed relative to the second notch engaging protrusion 62 is a second lock actuator 68. It may be appreciated that the first and second lock actuators 66 and 68 extend above the blade channel 54, while the first and second notch engaging protrusions 58 and 62 may selectively extend into the blade channel 54 insofar as they enter into the notches 16*a* and 16*b* respectively when the blade has been positioned in the blade channel 54. It may be appreciated that the first lock arm 60 and the second lock arm 64 may be resilient (e.g., spring steel or another biasing material) such that the arms are biased with the first and second notch engaging protrusions 58, 62 in the blade channel 54, however may be temporarily moved out of the blade channel 54 when the actuators 66, 68 are pressed inward (e.g., towards the plane of the blade channel 54.

As further shown in FIGS. 2 and 3, it may be appreciated that the second side 52 may have engagement features 70 extending above and/or below the channel 54, which may receive engagement features 72 of the first side 50, such that the first side 50 may be held adjacent to the second side 52, further defining the blade channel 54. As FIG. 3 further shows, in an embodiment the blade release actuators (44*a* and 44*b* respectively may be coupled together via a blade release coupler 74 having an actuator arm 74*a* extending to the blade release actuator 44*a* and an actuator arm 74*b* extending to the blade release actuator 44*b*. Similar to the lock arms 60 and 64, and the blade position arm 46, the actuator arms 74*a* and 74*b* may comprise a resilient or otherwise biased material that causes the blade release actuators 44*a*, 44*b* to be biased to disengage the second and first lock actuators 68 and 66 (when the blade holder assembly 14 is moved into a forward position such that the first and second lock actuators 66 and 68 align with the blade release actuators 44*a*, 44*b*), however when the blade holder assembly 14 is appropriately positioned and the blade release actuators 44*a*, 44*b* are pressed into the main body 12, the first and second lock actuators 66 and 68 will similarly be pressed towards the plane of the blade channel 54, and correspondingly press the first and second notch engaging protrusions 58 and 62 out of the notches 16*a* and 16*b* of the blade 16. Accordingly, when both blade release actuators 44*a*, 44*b* are pressed, the blade 16 may be slid forward out of the front slot 40 and when clear, a new blade 16 may be inserted into the front slot 40, until it abuts the channel terminating protrusion 56, aligning the blade notches 16*a* and 16*b* with the notch engaging protrusions 58 and 62, such that when the user disengages the blade release actuators 44*a*, 44*b*, the notch engaging protrusions 58 and 62 enter into the notches 16*a* and 16*b*, securing the blade 16 into the blade holder assembly 14.

While in the illustrated embodiment the notch engaging protrusions 58 and 62 are both associated with a respective one of the notches 16*a* and 16*b*, it may be appreciated that in other embodiments both notch engaging protrusions 58 and 62 may be associated with the same notch (e.g., 16*a*) and in still other embodiments both notch engaging protrusions 58 and 62 may be associated with both notches 16*a* and 16*b*. For example, the notch engaging protrusions 58 and 62 may be sized so that both together fit into a single notch (e.g., stacked one on top of the other within the notch) and may be forked so that both notch engaging protrusions 58 and 62 include a portion that extends into notch 16*a* and a portion that extends into notch 16*b*. Regardless it may be appreciated that other mechanisms where a plurality of notch engaging protrusions move to selectively engage one or more of the notches of the blade may be utilized in various embodiments.

Figure 4:
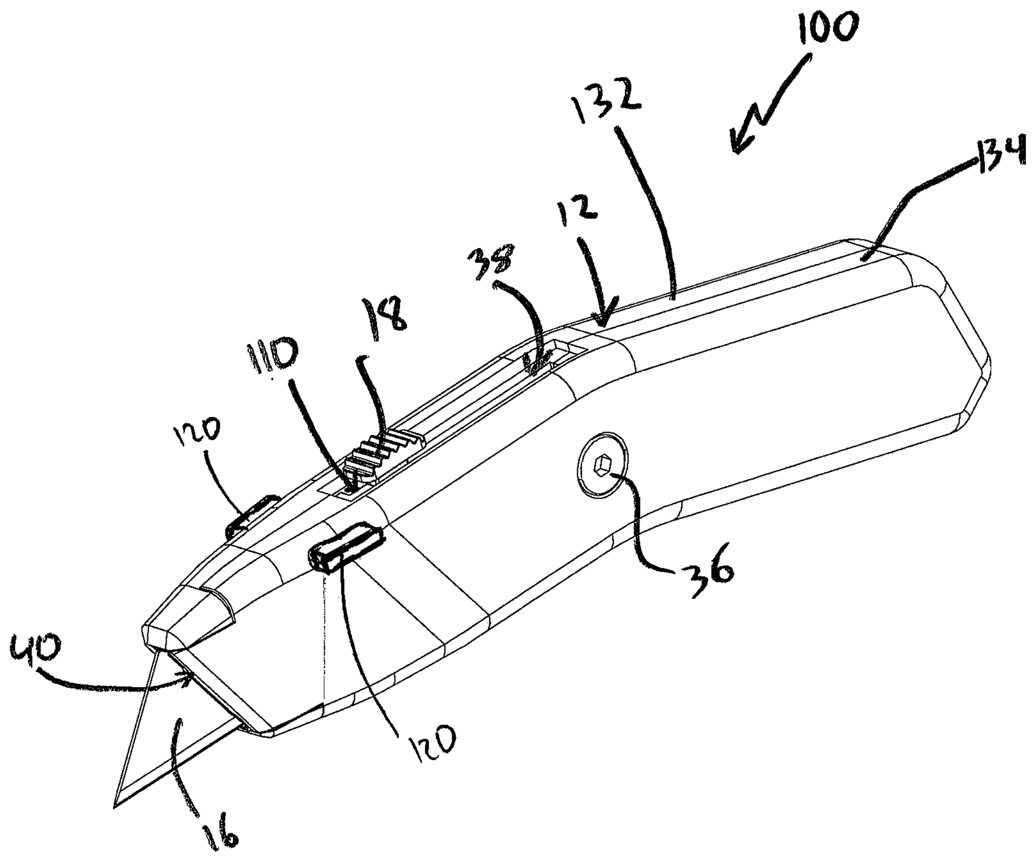
FIG. 4 illustrates a perspective view a utility knife according to another aspect of the present disclosure, with the blade holder assembly and blade extended in a forward cutting position.
Figure 5:
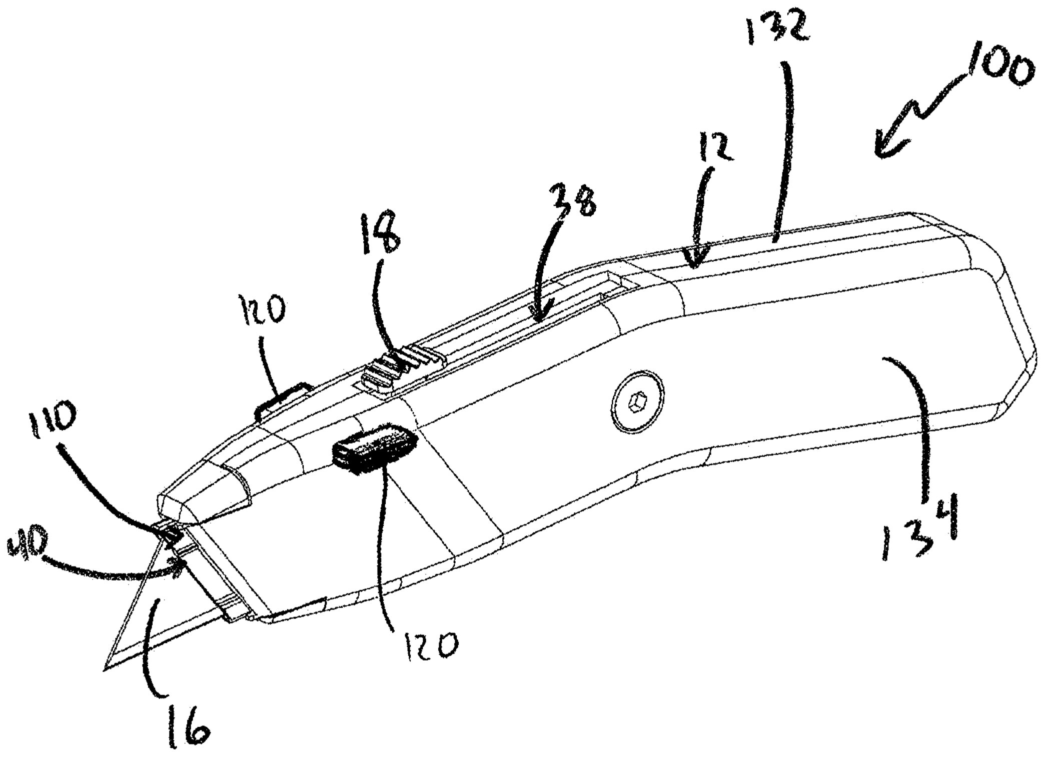
FIG. 5 illustrates the utility knife of FIG. 4, with the blade holder assembly extended into a blade replacement position.

As an example, FIGS. 4 and 5 depict a utility knife 100 according to another embodiment of the present disclosure. It may be appreciated that like elements may be numbered identical to or corresponding to elements described in FIGS. 1-3. As such, it may be appreciated that the main body 12 of the utility knife 100 includes mating body halves 132 and 134 (as described in greater detail below) which may be coupled by fastener 36 to form the knife handle with an upper slot 38. A blade holder assembly 110 of the knife 100 includes a manually engageable member 18, which may be depressed and slid along the slot 38 so as to move the blade holder assembly 110 and the blade 16 held therein relative to the main body 12 so that the blade 16 selectively extends from a front slot 40. In the knife 100, the manually engageable member 18 may move to a forwardmost cutting position as shown in FIG. 4, where the blade 16 would be locked relative to the main body 12 for cutting operations. As seen in FIG. 5, it may be appreciated that a blade release actuator 120 may be pressed so as to allow the blade holder assembly 110 to be selectively moved forward from the forwardmost cutting position into a blade release position, such that the blade holder assembly 110 spreads outwards away from the center of the front slot 40 so that the blade 16 may be removed from the blade holder assembly 110, as described in greater detail below.

Figure 6:
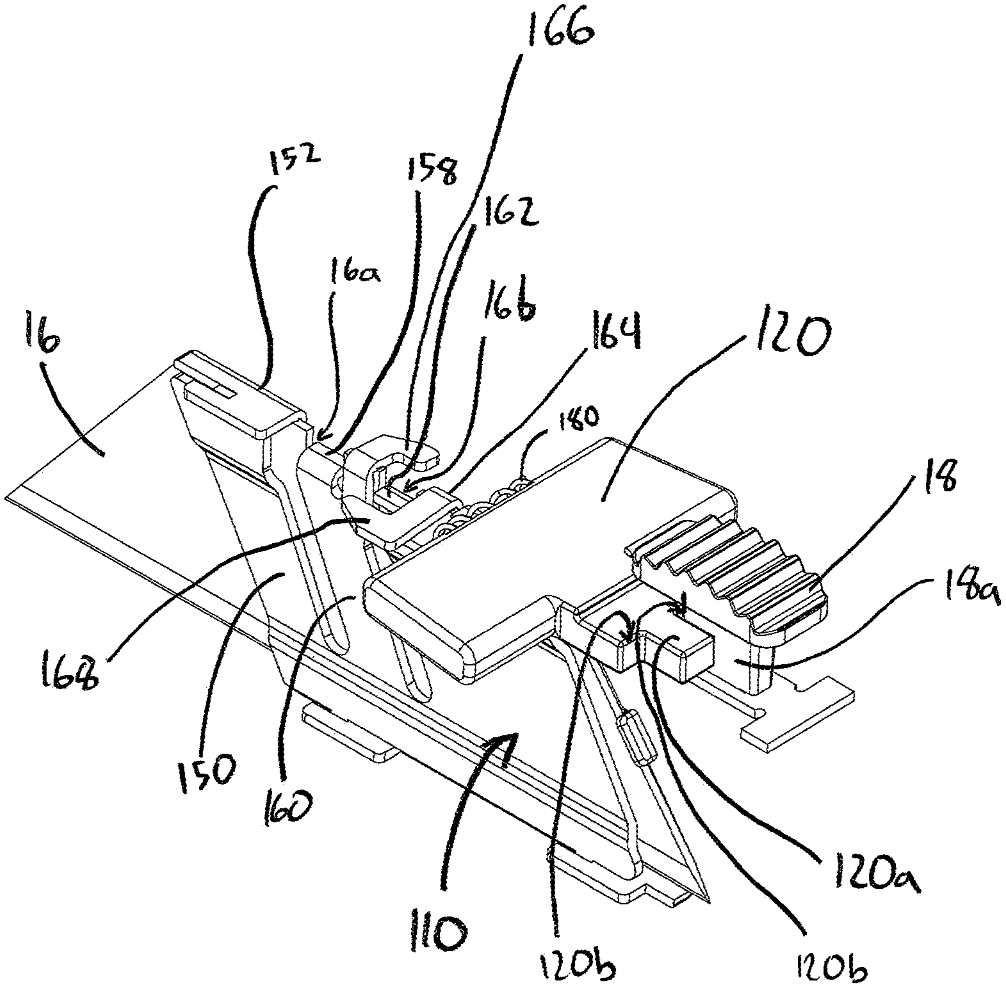
FIG. 6 illustrates an isolated perspective view of the blade holder assembly of the utility knife of FIG. 4 holding a blade therein, alongside a blade release actuator.

FIG. 6 illustrates the blade holder assembly 110 and the blade release actuator 120 in isolation so that features thereof may be appreciated in greater detail. As shown, the blade holder 110 includes a first side member 150 and a second side member 152, which may be similar to side members 50 and 52 as described above in some embodiments. As further shown, the first side member 150 includes a first notch engaging protrusion 158 extending from a first lock arm 160 and configured to selectively engage the notch 16*a*, while the second side member 152 includes a second notch engaging protrusion 162 extending from a second lock arm 164 and selectively engages the notch 16*b*, such that the first and second notch engaging protrusions 158 and 162 selectively engage the blade 16 to hold the blade 16 in the blade holder 110. It may be appreciated that the first notch engaging protrusion 158 is coupled to a first lock actuator 166, while the second notch engaging protrusion 162 is coupled to a second lock actuator 168, as described in greater detail below.

Turning briefly to the blade release actuator 120 of the knife 100, it may be appreciated that in some embodiments the blade release actuator 120 may include a protrusion 120*a* that extends generally into the slot 38, but has one or more stepped features 120*b* shaped so that when the blade release actuator 120 is not actuated, a post 18*a* of the manually engageable member 18 prevents further extension of the blade holder assembly 110 forward out of the main body 12, keeping the blade holder assembly in the forwardmost cutting position shown in FIG. 4. When the blade release actuator 120 is pressed so that a stepped feature 120*b* aligns with the post 18*a*, the manually engageable member 18 may be pushed further forward towards the front slot 40 such that the blade holder assembly moves into the blade release position the FIG. 5.

Figure 7:
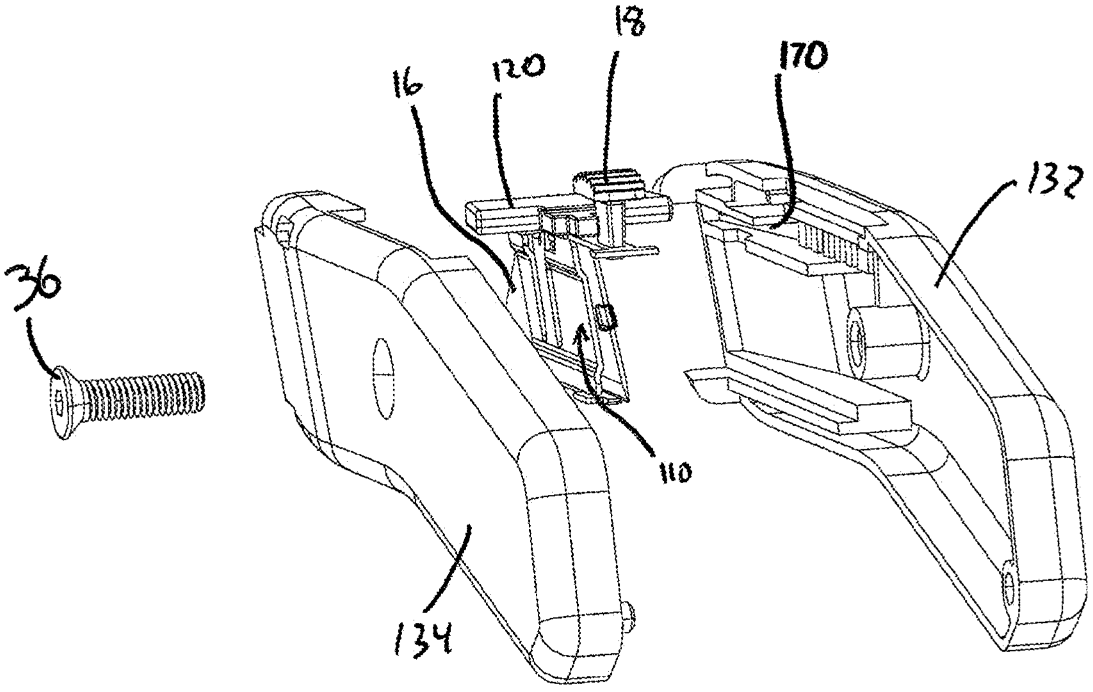
FIG. 7 illustrates a partially exploded view of the utility knife of FIG. 4, showing how ramped features of the knife housing engage blade lock features of the blade holder assembly.
Figure 8:
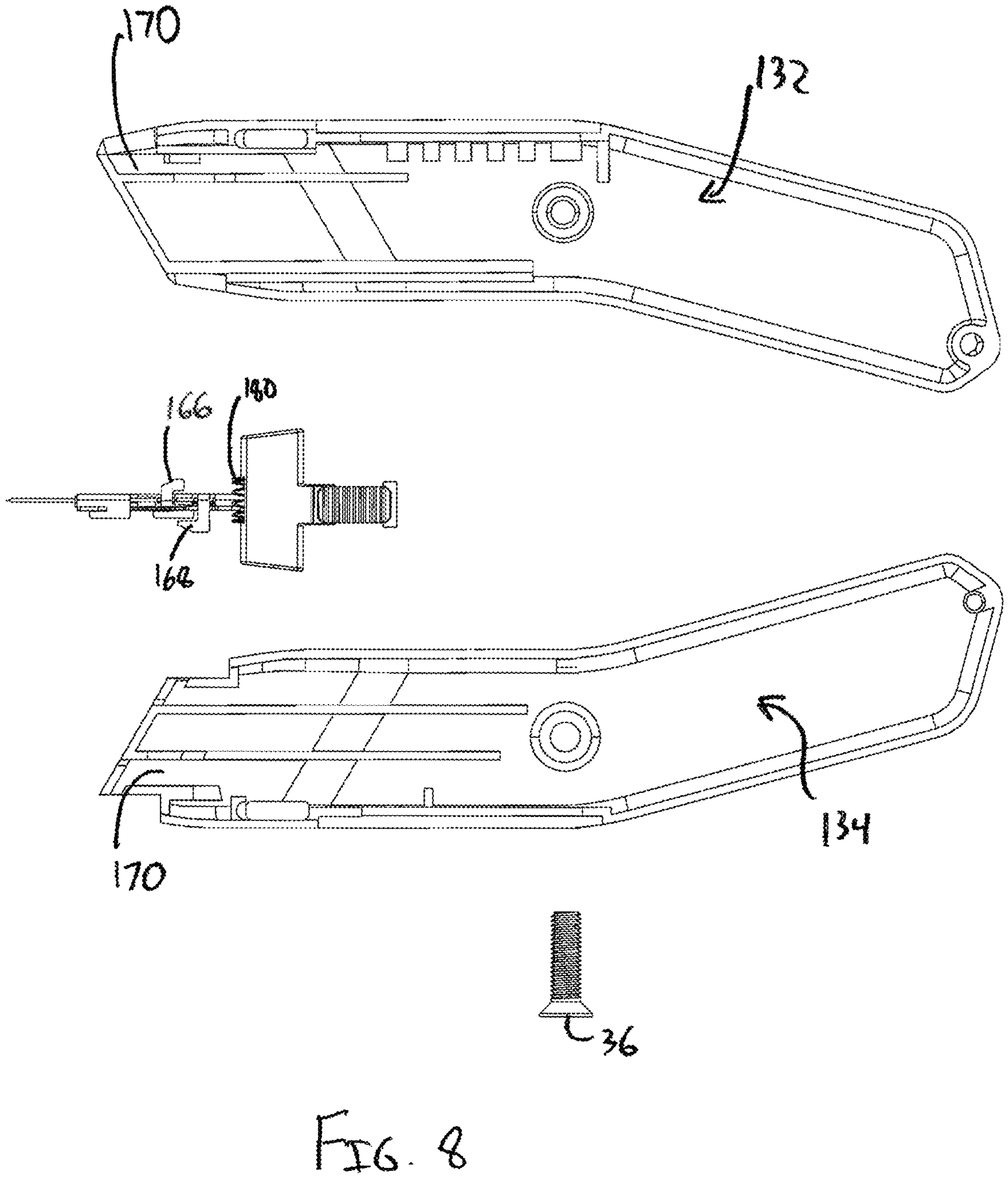
FIG. 8 illustrates another partially exploded view of the utility knife of FIG. 4, with knife housing sides rotated to show the corresponding ramped features of opposing sides of the utility knife.

As shown in FIG. 7 and FIG. 8, it may be appreciated that ramp features 170 formed at a forward position in each of the mating body halves 132 and 134, such that when the blade holder assembly 110 is moved into the blade release position, the ramp features 170 engage with corresponding ramped forwardmost regions of each of the first lock actuator 166 and the second lock actuator 168 so that forward movement of the blade holder assembly presses the first lock actuator 166 and the second lock actuator 168 inwards towards each other, correspondingly moving the first notch engaging protrusion 158 out of the first notch 16*a*, and moving the second notch engaging protrusion 162 out of the second notch 16*b*, such that the blade 16 may be pulled forward out of the front slot 40 to separate the blade 16 from the blade holder assembly 110.

Similar with the embodiment of the knife 10, it may be appreciated that while in the illustrated embodiment of the knife 100 the notch engaging protrusions 158 and 162 are both associated with a respective one of the notches 16*a* and 16*b*, in other embodiments both notch engaging protrusions 158 and 162 may be associated with the same notch (e.g., 16*a*) and in still other embodiments both notch engaging protrusions 158 and 162 may be associated with both notches 16*a* and 16*b*. For example, the notch engaging protrusions 158 and 162 may be sized so that both together fit into a single notch (e.g., stacked one on top of the other within the notch) and may be forked so that both notch engaging protrusions 158 and 162 include a portion that extends into notch 16*a* and a portion that extends into notch 16*b*.

In the illustrated embodiment the knife 100 includes a blade release actuator 120 that may be pressed into either the body half 132 or the body half 134, where the blade release actuator 120 is centrally biased by a spring 180 partially received in the blade release actuator 120 such that pressing the blade release actuator 120 in either direction compresses the spring 180 to provide a return bias. In other embodiments the blade release actuator 120 may be only on a single side (e.g., one of the body half 132 or the body half 134), having the appropriately positioned stepped feature 120*b* so as to permit the blade holding assembly 110 to move into the blade release position of FIG. 5. It may be appreciated that other appropriate biasing mechanisms may be utilized in other embodiments.

It may be appreciated that the components described herein may be of different constructions or configurations, including but not limited to one or more being comprised of different material choices. For example, the components described herein may each be constructed from a variety of materials, including but not limited to one or more plastics, metals, rubbers, elastomers, or any other appropriate material choice. For example, in an embodiment one or more of the components may be formed of aluminum (e.g., machined aluminum), iron (e.g., steel), or any other appropriate material. In some embodiments, the material choices may differ from component to component.

Although aspects of the invention have been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

What is claimed is:

1. A utility knife comprising:

a knife housing;

a blade holder housing;

a blade engaging assembly configured to selectively receive a removable blade in a blade channel of the blade holder housing, such that the removable blade is supported by the blade holder housing;

wherein the blade engaging assembly comprises a plurality of notch engaging protrusions configured to move to selectively enter the blade channel to engage one or more notches of the removable blade; and wherein a blade release actuator associated with the blade engaging assembly is configured to move or permit movement of the plurality of notch engaging protrusions out of the blade channel to permit removal of the removable blade from the blade engaging assembly; and wherein the plurality of notch engaging protrusions comprise a first notch engaging protrusion and a second notch engaging protrusion, and wherein the utility knife comprises a first lock actuator fixed relative to the first notch engaging protrusion, and a second lock actuator fixed relative to the second notch engaging protrusion.

2. The utility knife of claim 1, wherein the blade release actuator is biased into an unpressed position.

3. The utility knife of claim 1, wherein the knife housing comprises a main body shaped to engage a palm of a gripping hand.

4. The utility knife of claim 1, wherein the blade engaging assembly is a slidable blade assembly configured to slide relative to the knife housing, such that the removable blade is stored within the knife housing when the slidable blade assembly is in a retracted position, and a portion of the removable blade extends outwardly from the knife housing when the slidable blade assembly is in an extended position.

5. A utility knife blade holder comprising:

a housing;

a blade engaging assembly configured to selectively receive a removable blade in a blade channel of the housing, such that the removable blade is supported by the housing;

wherein the blade engaging assembly comprises a plurality of notch engaging protrusions configured to move to selectively enter the blade channel to engage one or more notches of the removable blade;

wherein a blade release actuator associated with the blade engaging assembly is configured to move or permit movement of the plurality of notch engaging protrusions out of the blade channel to permit removal of the removable blade from the blade engaging assembly; and wherein the housing comprises a first side and a second side, wherein the blade release actuator comprises a first blade release actuator located on the first side, and a second blade release actuator located on the second side.

6. The utility knife blade holder of claim 5, wherein the plurality of notch engaging protrusions comprise a first notch engaging protrusion and a second notch engaging protrusion, and wherein the first blade release actuator is configured to move or permit movement of the first notch engaging protrusion, and the second blade release actuator is configured to move or permit movement of the second notch engaging protrusion.

7. The utility knife blade holder of claim 5, wherein the plurality of notch engaging protrusions comprise a first notch engaging protrusion and a second notch engaging protrusion, and wherein the first notch engaging protrusion is spaced from the second notch engaging protrusion along a length of the housing, so as to separately selectively engage a pair of spaced notches of the one or more notches on the removable blade.

8. A utility knife blade holder comprising:

a housing;

a blade engaging assembly configured to selectively receive a removable blade in a blade channel of the housing, such that the removable blade is supported by the housing;

wherein the blade engaging assembly comprises a plurality of notch engaging protrusions configured to move to selectively enter the blade channel to engage one or more notches of the removable blade;

wherein a blade release actuator associated with the blade engaging assembly is configured to move or permit movement of the plurality of notch engaging protrusions out of the blade channel to permit removal of the removable blade from the blade engaging assembly; and wherein the plurality of notch engaging protrusions comprise a first notch engaging protrusion and a second notch engaging protrusion, and wherein the utility knife blade holder comprises a first lock actuator fixed relative to the first notch engaging protrusion, and a second lock actuator fixed relative to the second notch engaging protrusion.

9. The utility knife blade holder of claim 8, wherein the housing comprises a first side and a second side, wherein the blade release actuator comprises a first blade release actuator located on the first side, and a second blade release actuator located on the second side, and wherein the first blade release actuator is positioned to selectively engage the second lock actuator and wherein the second blade release actuator is positioned to selectively engage the first lock actuator.

10. The utility knife blade holder of claim 9, wherein pressing the first blade release actuator into the housing and pressing the second blade release actuator into the housing causes the first lock actuator and the second lock actuator to move inwardly closer to the blade channel, and cause the first notch engaging protrusion and the second notch engaging protrusion to move out of the blade channel.

* * * * *